Dec. 1, 1959
W. H. KÖHLER
2,915,304
INDICATING INSTRUMENT WITH NOISE-ABSORBING
PROPERTIES, PARTICULARLY A
SPEEDOMETER FOR VEHICLES
Filed Nov. 9, 1953
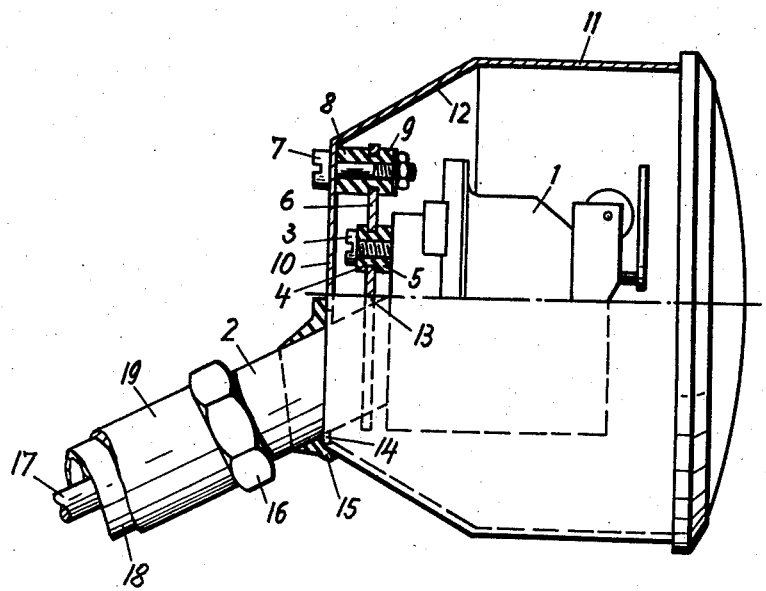
INVENTOR
WERNER H. KÖHLER
BY Decke and Craig.
ATTORNEYS.

United States Patent Office 2,915,304
Patented Dec. 1, 1959

2,915,304

INDICATING INSTRUMENT WITH NOISE-ABSORBING PROPERTIES, PARTICULARLY A SPEEDOMETER FOR VEHICLES

Werner H. Köhler, Stuttgart-Degerloch, Germany, assignor to Daimler-Benz Aktiengesellschaft, Stuttgart-Unterturkheim, Germany Application November 9, 1953, Serial No. 391,085

Claims priority, application Germany November 12, 1952

2 Claims. (Cl. 264—1)

The invention relates to an indicating instrument, particularly to a speedometer for vehicles, particularly passenger cars.

An object of the invention is to prevent noises, originating in the indicating instrument or getting into it, particularly speedometers in vehicles, from being transmitted to the driver's room or to the passenger room, respectively, by way of the instrument panel, in which the indicating instrument is mounted.

In designing automobiles, particularly passenger cars, there is the tendency to prevent all the noises that occur while the motor vehicle is running, from being transmitted to the driver's room or the passenger room, respectively. In order to arrive at this end it has been suggested to provide noise-absorbing material on all surfaces, the form or the position of which tends to decrease the transmitting of noises. It has also been recommended to provide the connecting pipes and leads between the engine room and the driver's room with rubber coats so as to be noise-absorbing. Moreover, for the instruments mounted in instrument panels, particularly for the speedometer directly connected with the engine or transmission, respectively, there have been known solutions which, by enveloping the driving shaft with a hose or by inserting an intermediate member made of rubber into the drive, should keep the noises of the engine off the instrument panel acting as a sound board.

Up to now, these arrangements have been insufficient, because either the metallic connection between the gear and the instrument panel continued to exist owing to the flexible driving shaft, or the ticking or whirring noises in the speedometer were not absorbed so that these noises amplified by the resonance of the instrument panel were transmitted to the range of the passengers' ears.

The invention aims at solving this problem. It is featured by the speed and mileage measuring system of a speedometer as well as its drive being suspended in a case or in an instrument panel, respectively, by using noise-absorbing material without metallic contact, and/or by parts of the measuring and indicating system subjected to the effect of the drive being made of suitable materials with noise-absorbing properties.

In this way, the noises transmitted to the instrument and generated by it are prevented from being transmitted to the instrument panel.

The invention is featured, furthermore, by the measuring and indicating system of the speedometer being arranged at and resiliently fastened to an intermediate plate so as to absorb noises, while this plate is arranged within and resiliently fastened to the case, by way of example at the rear wall of the case, so that noises will also be absorbed here. The socket for joining the driving shaft of the system should be connected to it or to the intermediate plate, and project through the rear wall of the case or through the intermediate plate, respectively, without any metallic contact.

Furthermore, in order to increase an absorbing of noises, it will be appropriate to cover the inner surface of the case or parts of it, and, just in case, the intermediate plate with a noise-absorbing material. More especially, these parts are thought to be sprayed with a mass adapted to avoid an occurring of dull sounds.

According to another feature of the invention, in order to prevent the noise dampening from being impaired by the envelope of the flexible driving shaft of the speedometer happening to contact one of the many conduits and leads below the instrument panel, this envelope is covered, in part or entirely, with a rubber hose, by way of example, in the range between the instrument and the gear. The non-metallic noise-absorbing materials of the other shims and connecting members may also consist of rubber; even felt and cork or such like materials are suitable for this end.

In order to prevent moisture and dust from getting into the interior of the instrument, the gap between the wall of the case and the socket for joining the driving shaft is packed by a rubber sleeve, by way of example.

In the accompanying drawing an example of design of the invention is illustrated.

The system 1 of a speedometer, for measuring and indicating speed and mileage, along with its socket member 2 for joining or connecting a driving shaft thereto, is resiliently fastened only at one point near an upper end portion thereof to an intermediate plate 6 by means of screws 3 and by using washers 4, 5 made of noise-absorbing materials. The intermediate plate 6 is resiliently fastened only at one point near its upper end to the back 10 of the case 11 of the speedometer by means of screws 7 without any metallic contact by also using washers and spacers 8, 9 consisting of noise-absorbing materials. The inner surface of the case is covered with sprayed noise-absorbing materials at 12. The socket 2 for joining the driving shaft of the system 1 projects through a recess or aperture 13 in the intermediate plate and through a recess or aperture 14 in the rear wall of the case. The drive shaft extension means of the speedometer extends rearwardly through both the apertures 13 and 14 in spaced relationship to the edges thereof so that a gap results therebetween. The gap between the recess 14 and the socket 2 for joining the driving shaft is packed by a rubber sound-absorbing sealing sleeve 15. The driving shaft 17 of the system and its protecting envelope 18 is connected to the socket 2 by means of the cap screw 16. A hose 19 made of rubber or plastics is pulled over the protecting sleeve 18 so as to avoid a metallic contact with the many conduits and leads below the instrument panel.

The measures according to the object of the invention are not only applicable to speedometers, but also to all kinds of instruments mounted in the instrument panel, particularly to those which produce noises by themselves, such as watches or those which are connected with, for example, the shaft 17 and suitable shaft actuating means driven by noise-producing mechanical plants, for instance engines, gear boxes, etc., of an automobile.

What I claim is:

1. An indicating instrument assembly for automobiles comprising an indicating mechanism, a housing having walls enclosing said mechanism, a vertically extending inner plate within said housing spaced from said housing walls, resilient non-metallic noise absorbing means for securing said plate to one wall of said housing solely at an upper end of said plate, said indicating mechanism being in spaced relationship with respect to both said housing and said plate, resilient noise absorbing means for securing the indicating mechanism to said plate on the side thereof opposite said one wall and solely at a part of said plate spaced below said first mentioned resilient noise absorbing means.

2. An indicating instrument assembly according to claim 1, wherein said indicating mechanism is a speedometer, said plate having an aperture located below the point of attachment of the indicating mechanism thereto, said one wall having an aperture registered opposite the aperture of said plate, speedometer drive shaft means connected to said mechanism and extending through both said apertures in spaced relationship to edges of the apertures of both the plate and the housing and extending to the exterior of the latter, and a resilient sound-absorbing sleeve for sealing the space between said speedometer drive shaft means and the edge of said housing aperture.

References Cited in the file of this patent

UNITED STATES PATENTS

| | | |
|---|---|---|
| 1,489,296 | Zaiden | Apr. 8, 1924 |
| 1,670,836 | Berge | May 22, 1928 |
| 1,685,050 | Gerns | Sept. 18, 1928 |
| 1,808,198 | Zubaty | June 2, 1931 |
| 1,907,283 | Waldheim | May 2, 1933 |
| 1,922,610 | Zubaty | Aug. 15, 1933 |
| 1,957,694 | Chamberlain et al. | May 8, 1934 |
| 2,245,918 | Hobbs | June 17, 1941 |
| 2,491,453 | Knobel | Dec. 13, 1949 |
| 2,517,147 | Vee | Aug. 1, 1950 |
| 2,733,159 | Scoggin et al. | Jan. 31, 1956 |

FOREIGN PATENTS

| | | |
|---|---|---|
| 676,122 | France | Nov. 18, 1929 |
| 445,385 | Italy | Feb. 14, 1948 |